(12) United States Patent
Kokorich

(10) Patent No.: US 12,263,964 B2
(45) Date of Patent: Apr. 1, 2025

(54) PROPULSION SYSTEM FOR A VEHICLE USING HEAT ENERGY ABSORBED IN AN ACTIVE COOLING SYSTEM

(71) Applicant: DESTINUS SA, Payerne (CH)

(72) Inventor: Mikhail Kokorich, Payerne (CH)

(73) Assignee: DESTINUS SA, Payerne (CH)

( * ) Notice: Subject to any disclaimer, the term of this patent is extended or adjusted under 35 U.S.C. 154(b) by 0 days.

(21) Appl. No.: 18/558,800

(22) PCT Filed: May 11, 2021

(86) PCT No.: PCT/EP2021/062415
§ 371 (c)(1),
(2) Date: Nov. 3, 2023

(87) PCT Pub. No.: WO2022/237965
PCT Pub. Date: Nov. 17, 2022

(65) Prior Publication Data
US 2024/0229746 A1    Jul. 11, 2024

(51) Int. Cl.
| | |
|---|---|
| *B64G 1/58* | (2006.01) |
| *B64G 1/14* | (2006.01) |
| *B64G 1/40* | (2006.01) |
| *B64G 1/50* | (2006.01) |
| *B64G 1/62* | (2006.01) |
| *F02K 9/42* | (2006.01) |
| *F02K 9/64* | (2006.01) |
| *F02K 9/74* | (2006.01) |

(52) U.S. Cl.
CPC .......... *B64G 1/58* (2013.01); *B64G 1/14* (2013.01); *B64G 1/401* (2013.01); *B64G 1/402* (2013.01); *B64G 1/4026* (2023.08); *B64G 1/50* (2013.01); *B64G 1/623* (2023.08); *F02K 9/42* (2013.01); *F02K 9/64* (2013.01); *F02K 9/74* (2013.01)

(58) Field of Classification Search
CPC .......... B64G 1/14; B64G 1/401; B64G 1/402; B64G 1/4026; B64G 1/58; F02K 9/42; F02K 9/44; F02K 9/46; F02K 9/48; F02K 9/64; F02K 9/766; F02K 9/972
See application file for complete search history.

(56) References Cited

U.S. PATENT DOCUMENTS

| | | | | |
|---|---|---|---|---|
| 3,140,064 A | * | 7/1964 | Gengelbach | F01K 15/00 244/58 |
| 3,267,664 A | * | 8/1966 | Jones | F02K 9/64 60/260 |
| 5,687,932 A | * | 11/1997 | Gomes | B64G 1/50 165/104.12 |

(Continued)

OTHER PUBLICATIONS

Nasa, What is Supersonic Flight? (Grades 5-8), May 19, 2009, NASA (Year: 2009).*

*Primary Examiner* — Kyle Robert Thomas
(74) *Attorney, Agent, or Firm* — BakerHostetler

(57) ABSTRACT

A vehicle for supersonic or hypersonic flight comprises a thermal rocket engine (1*b*) with a nozzle (2) and an active cooling system (8). The active cooling system cools a heat shield (6, 7). A working fluid absorbs heat inside the active cooling system and the heated working fluid expands through the nozzle to create thrust. Such a vehicle is suitable to fly a multi-skip trajectory, a boost-glide trajectory, a trajectory with a cruise phase or a re-entry into an atmosphere, for example.

22 Claims, 2 Drawing Sheets

(56) References Cited

U.S. PATENT DOCUMENTS

| | | | |
|---|---|---|---|
| 9,346,565 B1 * | 5/2016 | Hardy | ................. F02K 9/70 |
| 2004/0139723 A1 | 7/2004 | Parkin | |
| 2008/0217481 A1 | 9/2008 | Janeke | |

* cited by examiner

PROPULSION SYSTEM FOR A VEHICLE USING HEAT ENERGY ABSORBED IN AN ACTIVE COOLING SYSTEM

CROSS-REFERENCE TO RELATED APPLICATIONS

This application is a National Stage of International Application No. PCT/EP2021/062415, filed on May 11, 2021, the disclosure of which is incorporated by reference in its entirety.

TECHNICAL FIELD

The invention relates to a vehicle for a supersonic or a hypersonic flight. The vehicle comprises at least one thermal rocket engine and an active cooling system. The gas heated in the active cooling system is fed through a conventional rocket nozzle as a reaction mass to produce thrust.

The invention also relates to a method for operating a vehicle during a supersonic or hypersonic flight.

BACKGROUND ART

Several methods of spacecraft propulsion have been developed each having its own drawback and advantages. A large fraction of rocket engines in use today are chemical rockets. They obtain the energy needed to generate thrust by chemical reactions to create a hot gas that is expanded through a nozzle to produce thrust. A significant limitation of chemical propulsion is that it has limitations with specific impulse, which is the ratio of thrust produced to the mass of propellant needed at a certain rate of flow. The maximum temperature and pressure in the combustion chamber, as well as molecular mass of the exhaust gas limits the specific impulse. The best cryogenic rocket engines using paid hydrogen and oxygen can achieve specific impulse of 450 sec in vacuum.

Well known is so called thermal rocket propulsion. In this propulsion the reaction mass, usually gas with light molecular mass is heated with external source of energy, then it is fed through a conventional rocket nozzle to produce thrust. For example, arcjet thruster heats the reaction mass by electrical arc using energy from solar panels. In solar thermal propulsion, the propellant is heated by solar light concentrated by collector. The nuclear propulsion uses the nuclear reaction to heat the gas like hydrogen. The thermal rocket propulsion could have much higher specific impulse not only because for some types of thermal propulsion it can achieve higher reaction mass temperature than chemical engine, but primarily because it can use a reaction mass gas such as hydrogen with extremely low molecular mass. The lower molecular mass for the exhaust gas leads to higher specific impulse. Hydrogen has molar mass of 2 grams while water (exhaust gas for hydrogen oxygen engines) has molar mass of 18 grams. Specific impulse can achieve 1000 sec and higher for some types of thermal propulsion, and it is much higher than for chemical propulsion. But unlike for chemical propulsion, the thrust of the thermal rocket engine is always limited by the source of thermal energy, usually solar one. This is a reason why thermal propulsion that use solar energy is used only for slow orbital changes for satellites.

A vehicle entering from outer space into and through the gases of an atmosphere or a vehicle flying in the atmosphere on hypersonic velocity experiences atmospheric drag, which puts mechanical stress on the vehicle, and aerodynamic heating. Such vehicles intended for atmospheric entry or hypersonic flight require a thermal protection system which protects the vehicle structure from damage created by high temperature that can reach thousands of Kelvins. Multiple approaches for the thermal protection of vehicle are in use, among them ablative heat shields, passive cooling, and active cooling of vehicle surfaces.

An active cooling system usually comprises a heat shield made from temperature-resistant metal alloys that incorporate a working fluid circulating through them. Such an active cooling system has a mass penalty to the system due to the coolant's mass.

DISCLOSURE OF THE INVENTION

The problem to be solved by the present invention is to provide a vehicle with an improved performance.

This problem is solved by the subject of the independent device claim. According to this, a vehicle for a supersonic or hypersonic flight comprises at least one thermal rocket engine. The vehicle further comprises an active cooling system having channels for cooling a heat shield. The active cooling system and the thermal rocket engine are adapted such that the working fluid flows through the active cooling system, absorbs heat and fed through a conventional rocket nozzle as a reaction mass, where it expands to produce thrust.

In particular, the working fluid can absorb heat while it flows through the cooling channels of the active cooling system. This is an open-loop cooling system. Alternatively, a separate coolant flows through the cooling channels and a heat exchanger transfers the heat from the coolant to the working fluid. The coolant is part of a closed-loop cooling system.

In particular, the heat shield can be comprised of several segments with different maximum temperatures, and the working fluid can absorb heat from these elements, increasing its temperature flowing from coldest to hottest part. For example, the working fluid can initially be used for cooling structure pieces like vehicle body built from less heat resistant material like aluminium alloys and then cool the hottest parts of the vehicle, like leading edges or nose, made from more heat resistant materials like steel.

In this mode, the active cooling system is a thermal source for the working fluid (gas or liquid). The working fluid will be used as a reaction mass in the thermal rocket engine.

In a preferred embodiment the active cooling system is the main, in particular the only, thermal source for the working fluid of the thermal rocket engine. With other words, the working fluid is mainly heated by the heat absorption inside the active cooling system. The working fluid does not experience a chemical reaction but is mainly heated by an external source of energy.

In particular at least 50%, in particular at least 80%, in particular at least 90%, of the thermal energy of the working fluid expanding through the nozzle originates from the heat absorption in the active cooling system.

Compared to a chemical rocket engine, the energy from the heat flux inside the active cooling system replaces the chemical energy of the chemical reaction in a chemical rocket engine. Compared with a common thermal rocket propulsion, the amount of the thermal energy dissipated in the heat shield and absorbed by active cooling system could be very significant and the thrust generated by thermal engine could be comparable with chemical rocket engines.

Advantageously, said thermal rocket engine is called a "hot gas thermal rocket propulsion".

Heating the reaction mass by the active cooling system has the following advantages:

Compared to a chemical rocket engine, a lower molecular mass of the exhaust gas significantly increases the specific impulse. If using gaseous hydrogen as a working fluid, a specific impulse in the vacuum of the thermal rocket engine with hydrogen heated up to 1000° C. as a reaction mass will be around 600 sec, which is significantly higher than for the best chemical rockets. If we have a 30% mass fraction of working fluid in the initial mass of the vehicle, delta-V, of the created impulse per unit of vehicle mass, could be more than 2'100 m/sec; for 20% fraction, delta-V could be more than 1'300 m/sec.

It allows recovering a large part of the dissipated thermal energy during supersonic/hypersonic flight back to kinetic energy and it effectively eliminates the mass penalty for using coolant for an active cooling system.

An active cooling system is reusable because it needs not to be reinstalled after one or several flights, like ablation or thermal soaking heat shields. This reduces technical challenges and improves economic efficiency.

A thermal rocket engine not housing any combustion and using gases only heated up to a temperature of 1000° C. is easy to construct. In contrast to that, a chemical rocket engine permits the heating of reaction product gases to very high temperatures (2500° to 4100°).

The vehicle can be used in different scenarios. In a first exemplary scenario, the vehicle flies a multi-skip trajectory. The trajectory comprises a series of skips. The range of the vehicle is extended by employing aerodynamic lift in the atmosphere.

In a second exemplary scenario the vehicle flies a boost-glide trajectory. This trajectory comprises only one single skip.

Alternatively, in a third exemplary scenario the trajectory comprises a cruise phase. The cruise phase occurs when the aircraft levels to a set altitude. The vehicle flies during the cruise phase with a constant altitude.

In a fourth exemplary scenario the vehicle enters from space into the atmosphere, or from upper part of atmosphere (ex. mesosphere, or stratosphere) to lower atmosphere (e.g. troposphere). This flight phase is called atmospheric entry or re-entry. The vehicle is de-accelerating within the atmosphere.

In all mentioned scenarios the vehicle can vary the speed, i.e. accelerating or de-accelerating, or keeping the speed constant. The speed is supersonic or hypersonic. The vehicle experiences atmospheric drag, which puts mechanical stress on the vehicle and aerodynamic heating.

Advantageously, the heat shield is adapted to protect the vehicle during a supersonic or a hypersonic flight, in particular to protect the vehicle body, leading edges, in particular the nose and the front of the wings of the vehicle. In particular the heat shield can be made of metal, in particular of an austenitic nickel-chromium-based superalloy.

In a preferred embodiment, the thermal rocket engine is usable for propelling the vehicle, in particular for the main propulsion of the vehicle. "Main propulsion" is created by the main rocket engine in order to reach a high rocket velocity or sustain existing velocity and does not relate to any reaction control systems, orbital maintenance, maneuvering and attitude control.

Advantageously, the thermal rocket engine is usable also for de-accelerating the vehicle during re-entry. This requires a nozzle oriented towards the flow.

In a further embodiment, the reaction control system can be operated by multiple thrusters working in a thermal rocket propulsion mode.

Advantageously, the active cooling system is adapted to heat the working fluid by ΔT of at least 500 Kelvin, in particular at least 800 Kelvin, in particular at least 1000 Kelvin, in particular at least 1200 Kelvin. Said ΔT significantly increases the specific impulse of the thermal rocket engine. If the temperature is only increased to around 1200 K, the thermal rocket engine can be made of standard steel. If hydrogen is used as a working fluid, it could be stored as liquid hydrogen in a propellant tank in the cryogenic state with a temperature of around 20 K.

In an optional embodiment, the vehicle can comprise a thermal energy accumulator, like a tank, for storing heated working fluid. The thermal energy accumulator also can comprise an inert mass, like metal, or a phase-change-material. A phase change material is a substance which absorbs and releases sufficient energy at phase transition.

Such a thermal energy accumulator increases the total mass of the vehicle but provides the opportunity to use thermal rocket engines for example for reaction control system in the time when active cooling system is not functioning, for example when vehicle left atmosphere. Thermal energy is stored and dissipated later.

In particular, the vehicle can comprise a heat exchanger for vaporizing cold, stored liquid working fluid before introducing the working fluid in a gaseous state into the active cooling system. Such a design avoids a two-phase flow of the working fluid inside the cooling channels. It simplifies the design of the active cooling system.

Furthermore, the vehicle might comprise a chemical rocket engine in addition to the thermal rocket engine. The chemical rocket engine might be used during the initial propulsion of the vehicle or at any time during the flight to support or replace the thermal rocket engine. In particular, the chemical rocket engine is operable simultaneously with the thermal rocket engine.

In particular, the thermal rocket engine and the chemical rocket engine share the at least one nozzle. Gas heated by a chemical reaction and gas heated by the active cooling system can expand through the same nozzle either simultaneously or at different times. Furthermore, working fluid such as hydrogen heated in the active cooling system can additionally be mixed with oxidizer, for example oxygen, and burned inside the chemical rocket engine. The engine could operate in hydrogen rich mode to reduce the molecular mass of exhaust gas and reduce a chamber temperature. The thermal rocket engine and the chemical rocket engine can share compressors.

Advantageously, the active cooling system can operate at high pressure to create high enough pressure of gas for thermal rocket engine. The thermal rocket engine may require pressure of up to 100 bars and higher to operate on high enough trust mode. The high pressure can be created by the vaporization of working fluid in vaporizer.

Advantageously, the vehicle could be a spaceplane, i.e., it can fly and glide like an aircraft in earth's atmosphere and manoeuvre like spacecraft in outer space.

In a preferred embodiment, the vehicle is suitable to fly a multi-skip trajectory or a boost-glide trajectory or a trajectory with a cruise phase or a re-entry trajectory. A suitable trajectory extends the range or reduces the propellant mass for a given range.

The vehicle can also fly in cruise supersonic or hypersonic flight and use advantages of the thermal rocket propulsion working with or without chemical rocket engine.

Another problem to be solved by the present invention is to provide a method for operating a vehicle more efficiently.

This problem is solved by the subject of the independent method claim. According to this, a method for operating a thermal rocket engine is provided. The method comprises the following steps:

working fluid flows through the active cooling system, in particular through the cooling channels, wherein the working fluid absorbs heat, the heated working fluid expands through the at least one nozzle to create thrust.

Advantageously, the working fluid is not further heated before expanding through the nozzle, and does not participate in the chemical reaction that can substantially increase its molecular mass.

In particular, the method comprises a flight phase of atmospheric entry or of a supersonic or hypersonic flight, while the aerodynamic heating occurs at the heat shield. The heat is absorbed by the working fluid in the active cooling system and the heated working fluid is used as a reaction mass.

Advantageously, the flight is a suborbital boost-glide flight or a skip-glide flight, in particular wherein the thermal rocket engine is operated during at least one, in particular at least two entries, of the skip-glide flight.

In particular, the thermal rocket engine is operated in the first propulsion mode only from the beginning of an initial entry or later. Before the initial entry, in particular during launch of the vehicle, it might be propelled only by a chemical rocket engine.

Advantageously, the chemical rocket engine is operating, with or without the thermal engine during launch of the vehicle to its trajectory.

Other advantageous embodiments are listed in the dependent claims as well as in the description below.

BRIEF DESCRIPTION OF THE DRAWINGS

The invention will be better understood and objects other than those set forth above will become apparent from the following detailed description thereof. Such description makes reference to the annexed drawings, wherein.

MODES FOR CARRYING OUT THE INVENTION

Figure 1:
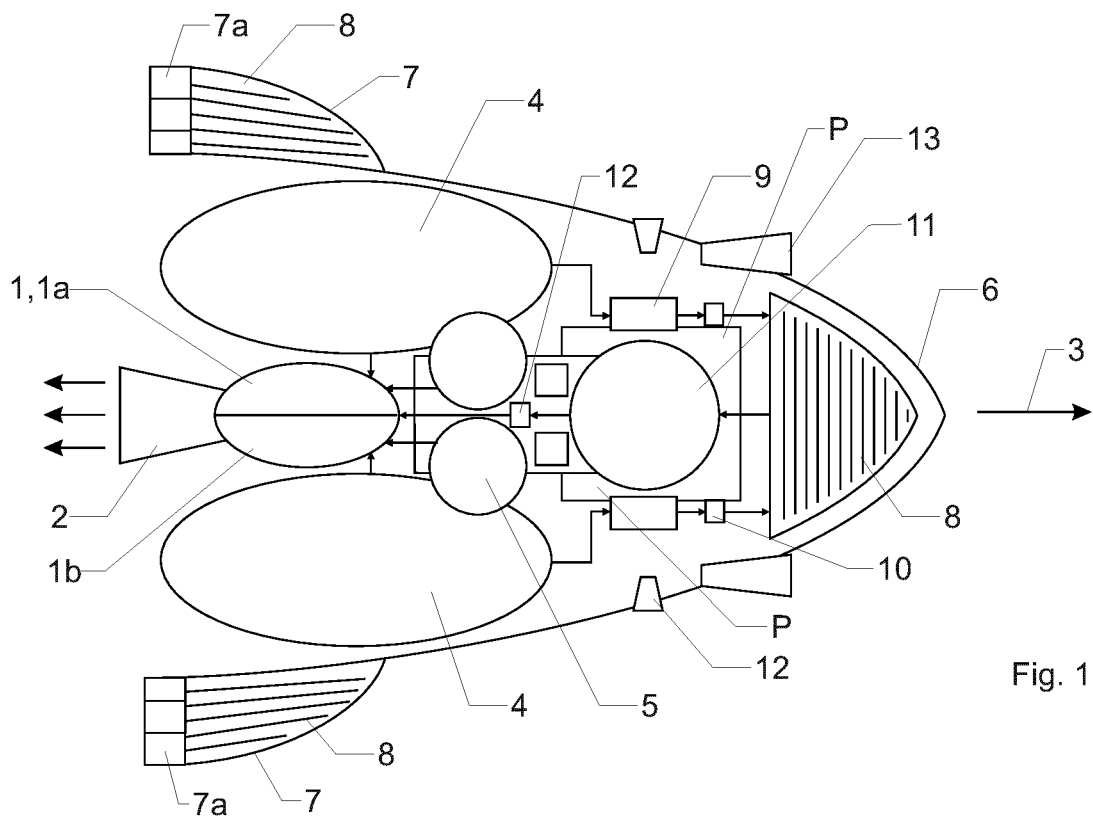
FIG. 1 shows a vehicle according to the invention.

FIG. 1 shows a schematic drawing of a vehicle according to the invention. The vehicle comprises a rocket engine 1 with a main nozzle 2. The main nozzle 2 is arranged at the back of the vehicle and creates substantial thrust for propelling the vehicle in the main flight direction 3. The vehicle can transport a payload "P".

The vehicle further comprises hydrogen tanks 4 which store liquid hydrogen in a cryogenic state, i.e. with a temperature around 20 K. Liquid hydrogen is a common liquid fuel for rocket engines. These hydrogen tanks take up much space and weight in the vehicle. Oxygen tanks are arranged in the centre part of the vehicle. Hydrogen is mixed with the oxidizer oxygen and burned in a chemical rocket engine 1a, which is part of the rocket engine 1.

The vehicle shown in FIG. 1 comprises heat shields arranged at leading edges. Leading edges of this vehicle are the nose and the front of the wings.

First leading edges 6 are arranged at the nose and second leading edges 7 are arranged at the front of the wings. The wings comprise aerodynamic control surfaces like flaps. The heat shields are cooled by an active cooling system 8 comprising multiple cooling channels while the vehicle flights through the gases of an atmosphere. The atmosphere drags and heats the vehicle.

Furthermore, the rocket engine 1 comprises a thermal rocket engine 1b. A thermal rocket engine is understood to be an engine which does not burn the fuel. The thermal rocket engine works as follows:

Liquid hydrogen pumps out of the hydrogen tanks 4 with an electrical pump or turbopump and vaporizes inside the heat exchangers 9. The gaseous hydrogen is under high pressure due to its vaporization. It can further be compressed by the compressors 10 and further flows into the cooling channels of the active cooling system 8. Inside the active cooling system 8 the gaseous hydrogen absorbs heat by convective heat transfer. The heat shield is cooled and the gaseous hydrogen is heated up. Hydrogen flows out of the cooling channels with a temperature of around 1000° C. and can be stored in a hot hydrogen tank 11. The storage of hydrogen is possible but not necessary. Also thermal energy accumulator could be used to store some of the energy during active cooling, and release this energy to the working fluid (heat hydrogen for example) when active cooling is not operating. Heated, gaseous hydrogen can directly flow through a compressor 12 into the thermal rocket engine 1b which is part of the rocket engine 1. The thermal rocket engine 1b does not burn the hydrogen, but the hydrogen only expands through the nozzle 1 due to its heat absorbed inside the cooling channels. With other words, the active cooling system is the only thermal source for the working fluid which is used as a reaction mass in the thermal rocket engine.

Hydrogen has good cooling capabilities and can provide around 18.6 MJ/kg liquid hydrogen for a 1000° C. hot surface. Around 1'000 kg of liquid hydrogen is needed to dissipate 20'000 MJ of energy, which should be enough for the vehicle mass around 5'000 kg re-entering atmosphere one or several times.

Gaseous hydrogen heated up to 1000° C. and used as a reaction mass in the rocket engine provides a specific impulse in the vacuum of around 610 sec, which is significantly higher than for any known chemical rockets. The propulsion system can use the same working fluid for cooling the heat shield and for propelling the vehicle. This decreases the needed initial velocity of the vehicle and reduces the required mass for propellant components. If the active cooling system cools the heat shield around 1000° C., the heat shield can be made from low-cost, high-temperature resistant steel alloys, such as Inconel.

The heated hydrogen does not have to be stored in the hot hydrogen tank 11 if propulsion is required at the same time as the atmosphere drags and heats the vehicle. Such an application is required during a suborbital skip-glide flight, which will be further illustrated in FIG. 2.

Heated hydrogen cannot only be used to create trust for propelling the vehicle in the main flight direction 3. Heated hydrogen can also be used as reaction mass in nozzles 13 arranged at the front in order to deaccelerate the vehicle or as a reaction mass for a reaction control system illustrated by the nozzles 14.

As already mentioned, the rocket engine does not only comprise a thermal rocket engine. It also comprises a chemical rocket engine. A chemical rocket engine is especially required during an initial phase of the space flight, if hydrogen cannot be heated up to a sufficient high temperature or if more thrust is required as can be provided by the heated hydrogen. Gaseous hydrogen, heated or unheated, is mixed with oxygen stored in tanks 5 and the mixture is burned inside a combustion chamber of the chemical rocket engine.

The rocket engine can work either as a thermal rocket engine or as a chemical rocket engine. But on the other hand, the rocket engine can simultaneously work as a thermal rocket engine and a chemical rocket engine. In the latter case, a part of hydrogen is heated up by the cooling system and flows through the nozzle without being burned. In the same time, another part of hydrogen is mixed with oxygen and burned inside the combustion chamber.

Both the thermal rocket engine and the chemical rocket engine can share compressors and nozzles.

Figure 2:
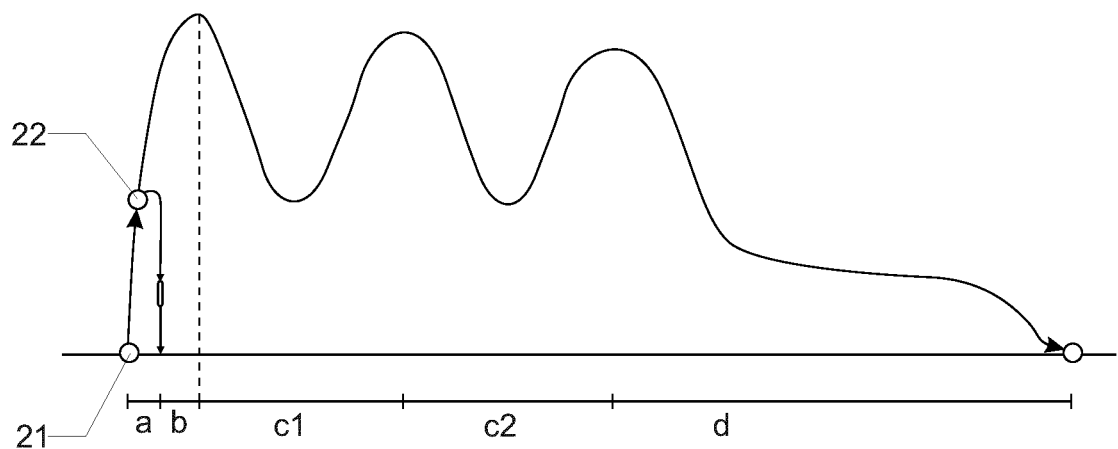
FIG. 2 shows a possible multi-skip-flight trajectory of the vehicle of FIG. 1.

FIG. 2 shows a possible flight trajectory of the vehicle of FIG. 1. It shows a spaceflight of a suborbital transportation to any destination on Earth. It is a trajectory of a multi-skip flight.

On take-off 21, a rocket booster (not shown in FIG. 1) propels the vehicle from a specially designed hyperport to its trajectory. The booster is separated from the rocket at trajectory point 22 and lands vertically back at the hyperport, where the ground team can prepare it for the next flight. Such boosters are well known and can be operated by liquid hydrogen and liquid oxygen.

After booster separation, i.e. after the flight phase indicated by "a" in FIG. 2, the vehicle is propelled by the chemical rocket engine. This flight phase is indicated by "b" in FIG. 2 and ends with reaching the apogee. Then, the flight is followed by a multi-skip trajectory. This is a trajectory that extends the range of the suborbital vehicle by using aerodynamic lift in the atmosphere. It can significantly extend the range over the ballistic trajectory depending on the number of entries.

From the beginning of the first entry, i.e. starting with phase "c1", the vehicle is mainly propelled by the thermal rocket engine. Depending on the trajectory, the propulsion might be supported by the chemical rocket engine. The vehicle flies two loops "c1" and "c2" and then the flight ends with a landing phase "d".

Thus, the present vehicle has two different delta-V sources. First, the chemical rocket engine propels the vehicle and the vehicle ends up with a total delta-V at first entry that can achieve 4'000-5'000 m/sec. Secondly, the thermal rocket engine creates another delta-V of 2'000-3'000 m/sec to sustain velocity decreased by atmospheric drag, or even increase the velocity.

Figure 3:
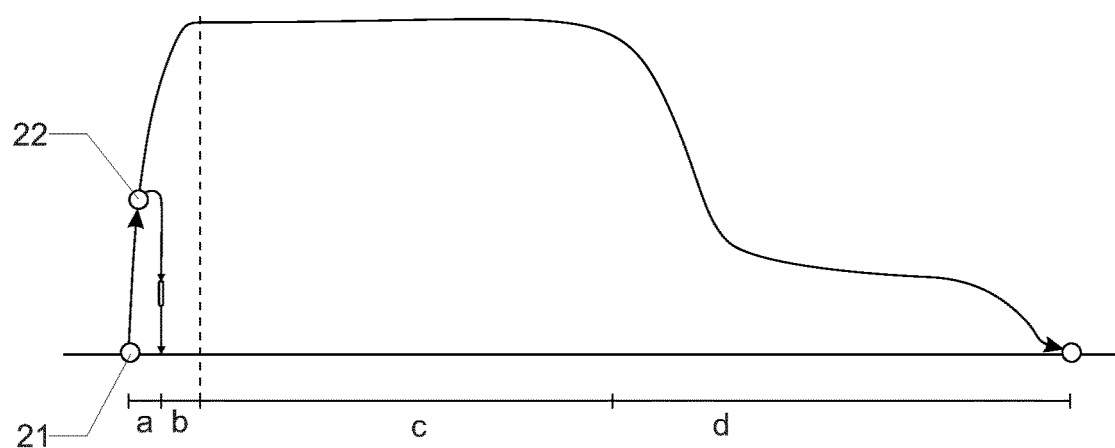
FIG. 3 shows a possible trajectory of the vehicle of FIG. 1 with a cruise phase.

FIG. 3 shows an alternative trajectory. It is the trajectory of a steady-flight or cruise in the atmosphere. The flight-phases "a" and "b" are identical to the trajectory shown in FIG. 2. After apogee, the vehicle flies on a constant altitude or varying altitude within the atmosphere and is propelled separately or simultaneously by the thermal rocket engine and by the chemical rocket engine.

Figure 4:
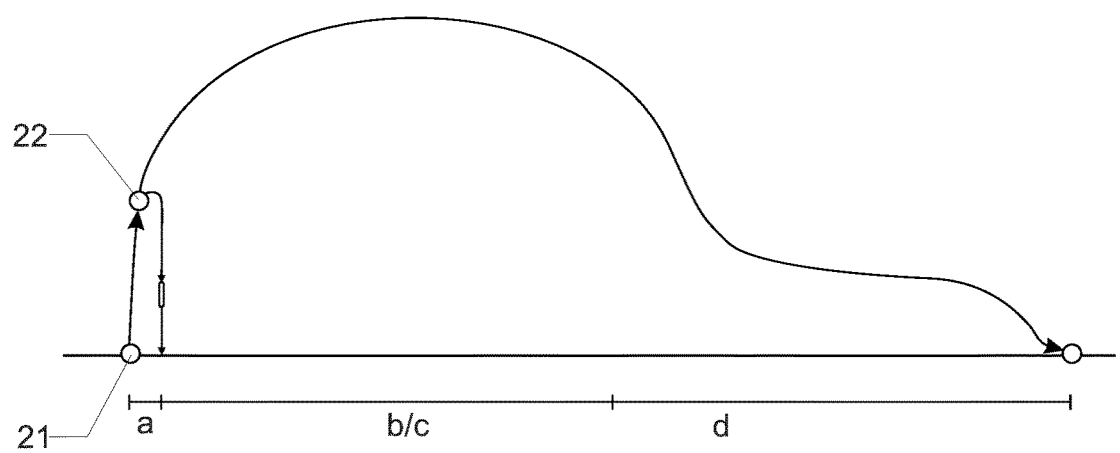
FIG. 4 shows a possible flight trajectory of the vehicle of FIG. 1 with one single skip.

FIG. 4 shows another alternative flight trajectory. It is the trajectory of a boost-glide flight comprising only one single skip. After booster separation at point 22, the vehicle is propelled primarily by the chemical rocket engine. The vehicle follows a ballistic trajectory.

Figure 5:
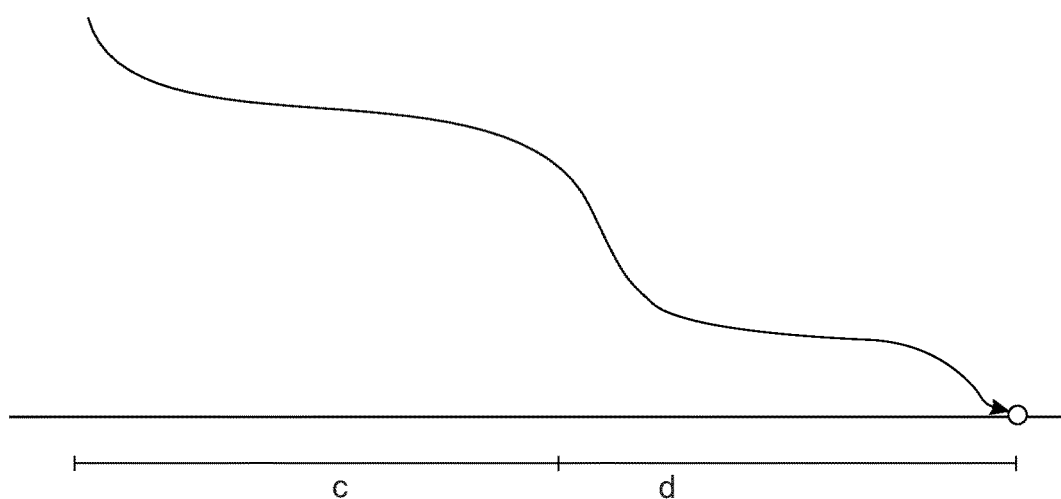
FIG. 5 shows a possible flight trajectory with an atmospheric re-entry.

FIG. 5 shows the flight trajectory of a vehicle entering the atmosphere from the space. The flight phase is called re-entry.

The invention claimed is:

1. A vehicle for a supersonic or hypersonic flight, comprising:
   at least one thermal rocket engine with at least one nozzle,
   an active cooling system having cooling channels for cooling a heat shield to protect leading edges of the vehicle,
   a reaction control system with at least one nozzle, and
   wherein the thermal rocket engine and the active cooling system comprise:
   a working fluid absorbing heat in the active cooling system, and
   the heated working fluid expanding through the at least one nozzle to create thrust,
   wherein the thermal rocket engine is configured for main propulsion of the vehicle in order to propel the vehicle to high rocket velocity or to sustain an existing velocity of the vehicle.

2. The vehicle according to claim 1, wherein the active cooling system is a main thermal source for the working fluid of the thermal rocket engine.

3. The vehicle according to claim 1, wherein
   the working fluid absorbs heat while flowing through the cooling channels, or
   a coolant absorbs heat while flowing through the cooling channels and the absorbed heat is transferred from the coolant to the working fluid via a heat exchanger.

4. The vehicle according to claim 1, wherein the heat shield is adapted to protect the vehicle during a supersonic or hypersonic flight.

5. The vehicle according to claim 1, wherein the thermal rocket engine is usable for de-accelerating the vehicle, and wherein at least one of the at least one nozzle is arranged at a front of the vehicle.

6. The vehicle according to claim 1, wherein the heated working fluid expands through the at least one nozzle of the reaction control system.

7. The vehicle according to claim 1, wherein the active cooling system is adapted to heat the working fluid by ΔT of at least 500 Kelvin.

8. The vehicle according to claim 1, wherein the working fluid is hydrogen.

9. The vehicle according to claim 1, comprising a thermal energy accumulator for storing working fluid heated by the active cooling system.

10. The vehicle according to claim 9, wherein the thermal energy accumulator comprises an inert mass or phase-change material.

11. The vehicle according to claim 1, comprising a heat exchanger for vaporizing cold, stored working fluid before introducing the working fluid into the active cooling system.

12. A vehicle for a supersonic or hypersonic flight, comprising:
    at least one thermal rocket engine,
    at least one chemical rocket engine,
    at least one nozzle,
    an active cooling system having cooling channels for cooling a heat shield,
    wherein the at least one thermal rocket engine and the active cooling system comprise:
    a working fluid absorbing heat in the active cooling system, and the heated working fluid expanding through the at least one nozzle to create thrust,
wherein at least one of the at least one thermal rocket engine and at least one of the at least one chemical rocket engine share at least one of the at least one nozzle.

13. The vehicle according to claim 12, wherein the at least one thermal rocket engine and the at least one chemical rocket engine share compressors.

14. The vehicle according to claim 12, wherein the vehicle is a spaceplane.

15. The vehicle according to claim 12, suitable to fly a multi-skip trajectory or a boost-glide trajectory or a trajectory with a cruise phase or a re-entry trajectory.

16. A method for operating a vehicle wherein the vehicle comprises: at least one thermal rocket engine with at least one nozzle and a reaction control system with at least one nozzle,
an active cooling system having cooling channels for cooling a heat shield to protect leading edges of the vehicle, wherein the method comprises the following steps:
working fluid flows through the active cooling system, in particular through the cooling channels, and the working fluid absorbs heat,
the heated working fluid expands through the at least one nozzle to create thrust,
wherein the at least one thermal rocket engine is configured for main propulsion of the vehicle in order to propel the vehicle to high rocket velocity or to sustain an existing velocity of the vehicle.

17. The method according to claim 16, wherein the working fluid is not further heated before expanding through the nozzle.

18. The method according to claim 16, wherein the method comprises a flight phase with a supersonic or hypersonic speed, while the vehicle is propelled by the at least one thermal rocket engine.

19. The method according to claim 16, wherein the method is applied during one or several skips of a multi-skip flight or during a boost-glide flight, or during a cruise phase or during an atmospheric re-entry.

20. The method according to claim 18, wherein the vehicle is propelled by the at least one thermal rocket engine only from a beginning of an initial entry or later.

21. The method according to claim 16, wherein the vehicle comprises a chemical rocket engine, wherein the at least one thermal rocket engine and the chemical rocket engine are working simultaneously.

22. The method according to claim 21, wherein not the at least one thermal rocket engine but the chemical rocket engine is operating during launch of the vehicle to its suborbital trajectory.

* * * * *